US012111642B2

(12) United States Patent
Belouin et al.

(10) Patent No.: US 12,111,642 B2
(45) Date of Patent: Oct. 8, 2024

(54) METHOD AND ELECTRONIC DEVICE FOR MONITORING A MANUFACTURING OF A METAL PRODUCT, RELATED COMPUTER PROGRAM AND INSTALLATION

(71) Applicant: ArcelorMittal, Luxembourg (LU)

(72) Inventors: Bertrand Belouin, Montrouge (FR); Jean-Michel Arbiol, Valencia (ES)

(73) Assignee: ARCELORMITTAL, Luxembourg (LU)

( * ) Notice: Subject to any disclaimer, the term of this patent is extended or adjusted under 35 U.S.C. 154(b) by 785 days.

(21) Appl. No.: 17/273,612

(22) PCT Filed: Sep. 6, 2019

(86) PCT No.: PCT/IB2019/057525
§ 371 (c)(1),
(2) Date: Mar. 4, 2021

(87) PCT Pub. No.: WO2020/049515
PCT Pub. Date: Mar. 12, 2020

(65) Prior Publication Data
US 2021/0365018 A1    Nov. 25, 2021

(30) Foreign Application Priority Data

Sep. 6, 2018    (WO) .................. PCT/IB2018/056804

(51) Int. Cl.
*G05B 19/41* (2006.01)
*C23C 2/00* (2006.01)
(Continued)

(52) U.S. Cl.
CPC ...... *G05B 19/41875* (2013.01); *C23C 2/0035* (2022.08); *C23C 2/0038* (2022.08);
(Continued)

(58) Field of Classification Search
CPC .......... G05B 19/41875; G05B 19/4184; G05B 19/41885; G05B 2219/32197;
(Continued)

(56) References Cited

U.S. PATENT DOCUMENTS 6,240,330 B1    5/2001 Kurtzberg et al.
6,430,461 B1 *  8/2002 Andorfer ................ B21B 37/00
                                                    700/148
(Continued)

FOREIGN PATENT DOCUMENTS

CN        101801603 A    11/2010
DE    102010037552 A1     3/2012
(Continued)

OTHER PUBLICATIONS

Search Report for PCT/IB2019/057525.
Search Report for PCT/IB2018/056804.

*Primary Examiner* — Michael J Brown
(74) *Attorney, Agent, or Firm* — Davidson Kappel LLC (57) ABSTRACT

A method for monitoring a manufacturing of a metal product, the metal product being manufactured according to a manufacturing process, is implemented by an electronic monitoring device. This method includes acquiring (100) a measured value of at least one representative parameter, each representative parameter being a parameter relating to the metal product or a parameter relating to the manufacturing process, determining (130) a status of the metal product among a compliant status and an analysis status, depending on the at least one acquired value and on at least one target, and when the determined status is the analysis status, computing (150) a corrective action to be applied to the product, among a set of corrective actions and depending on the at least one acquired value, the set of corrective (Continued)

actions including a product repair, a product downgrading, a product expertise and a product acceptance.

16 Claims, 4 Drawing Sheets

(51) Int. Cl.
| | | |
|---|---|---|
| *C23C 2/02* | (2006.01) | |
| *G05B 19/418* | (2006.01) | |
| *G06F 30/20* | (2020.01) | |
| *G06F 111/10* | (2020.01) | |
| *G06F 119/18* | (2020.01) | |
| *G06Q 50/04* | (2012.01) | |

(52) U.S. Cl.
CPC .............. *C23C 2/004* (2022.08); *C23C 2/022* (2022.08); *C23C 2/51* (2022.08); *C23C 2/52* (2022.08); *G05B 19/4184* (2013.01); *G05B 19/41885* (2013.01); *G06F 30/20* (2020.01); *G06F 2111/10* (2020.01); *G06F 2119/18* (2020.01)

(58) Field of Classification Search
CPC ........... G05B 2219/32212; G05B 2219/32217; G05B 2219/32218; G05B 2219/32228; C23C 2/0035; C23C 2/0038; C23C 2/004; C23C 2/022; C23C 2/51; C23C 2/52; C23C 2/36; G06F 30/20; G06F 2111/10; G06F 2119/18; G01N 2021/8411; G06Q 50/04; Y02P 90/02

USPC ........................................................ 700/108
See application file for complete search history.

(56) References Cited

U.S. PATENT DOCUMENTS

| | | | |
|---|---|---|---|
| 6,697,516 B1 | 2/2004 | Alexandre | |
| 6,778,694 B1 | 8/2004 | Alexandre | |
| 2007/0106400 A1 | 5/2007 | Mukhopadhyay | |
| 2009/0029214 A1 | 1/2009 | Le Gonidec | |
| 2009/0248173 A1 | 10/2009 | Sasko et al. | |
| 2010/0219964 A1* | 9/2010 | Hunt | G01N 29/46 73/579 |
| 2010/0291836 A1 | 11/2010 | Bavestrelli et al. | |
| 2014/0005981 A1 | 1/2014 | Loffler | |
| 2019/0071750 A1 | 3/2019 | Biglari et al. | |

FOREIGN PATENT DOCUMENTS

| | | | |
|---|---|---|---|
| EP | 1608472 | B1 | 9/2016 |
| FR | 2761474 | A1 | 10/1998 |
| FR | 2761475 | A1 | 10/1998 |
| FR | 2761476 | A1 | 10/1998 |
| KR | 1020030054530 | A | 7/2003 |
| KR | 1020090006789 | A | 1/2009 |
| KR | 1020170070902 | A | 6/2017 |
| WO | WO9818970 | A1 | 5/1998 |
| WO | WO2009010849 | A2 | 1/2009 |
| WO | WO2016111763 | A1 | 7/2016 |
| WO | WO2017157692 | A1 | 9/2017 |
| WO | WO2018051366 | A1 | 3/2018 |

* cited by examiner

METHOD AND ELECTRONIC DEVICE FOR MONITORING A MANUFACTURING OF A METAL PRODUCT, RELATED COMPUTER PROGRAM AND INSTALLATION

This is the U.S. national phase of International Application No. PCT/IB2019/057525 filed 6 Sep. 2019, which designated the U.S. and claims priority to International Application No. PCT/IB2018/056804 filed 6 Sep. 2018, the entire contents of each of which are hereby incorporated by reference herein.

FIELD

The present disclosure relates to a method for monitoring a manufacturing of a metal product, the metal product being manufactured according to a manufacturing process, the monitoring method being implemented by an electronic monitoring device.

The present disclosure also relates to a non-transitory computer-readable medium comprising a computer program including software instructions which, when executed by a processor, implement such a monitoring method.

The present disclosure also relates to an electronic monitoring device for monitoring the manufacturing of the metal product.

The present disclosure also relates to an installation for delivering a metal product, the installation comprising a manufacturing line for manufacturing the metal product according to a manufacturing process, and such an electronic monitoring device.

BACKGROUND

In many industries, particularly in industries for manufacturing metal products, such as the steel industry, products are manufactured using continuous or semi-continuous processes comprising one or more stages, the proper execution of which must be monitored to ensure that the obtained products are conform to predefined desired characteristics. Each of the manufacturing stages is carried out by applying setpoints for process parameters, these setpoints being chosen in such a way that the desired characteristics for the products are obtained at the end of the manufacturing process.

To monitor the manufacturing of such metal products, the process parameters associated with the setpoints are recorded and it is constantly checked that these process parameters comply with the setpoints, i.e. that each parameter does not deviate from the corresponding setpoint by a too large value. In addition, the characteristics of the obtained products are measured and compared with specifications.

When a deviation is noted, an alert is issued and an operator performs a particular action based on the issued alert.

US 2014/0005981 A1 describes, for example, a method for statistical quality assurance during examination of steel products within a steel class. This document discloses acquiring a value of a mechanical characteristic of the steel product, from a sample of the product and during the manufacturing process. The acquired value is then compared to previously recorded values of the same mechanical characteristic. A statistical deviation between the acquired value and the previously recorded values is computed and, based on this computed deviation, a probability to obtain the desired mechanical characteristic for the final steel product is calculated.

EP 1 608 472 B1 discloses a system for on-line property prediction over the length of a hot rolled coil, when the coil is being rolled, to improve quality and to achieve stringent property requirements, allowing an operator to take corrective actions so as to get nearly uniform mechanical characteristics along the length of the coil. It describes in particular cooling the strip before coiling it in the down coiler.

However, such methods are not optimal, and requires important analytical work by each operator.

SUMMARY

An object of the present disclosure is therefore to provide a more reliable and efficient computer-implemented method, and a related electronic device, for monitoring a manufacturing of a metal product and thereby to increase the productivity of the manufacturing process.

A further object of the present disclosure is to provide a method allowing to increase the quality rate of products delivered to the customers without impairing the productivity of the manufacturing process.

For this purpose, the subject-matter of the present disclosure is a method for monitoring a manufacturing of a metal product the metal product being manufactured according to a manufacturing process, the manufacturing process including a manufacturing route for obtaining a final metal product with final characteristics, the manufacturing route comprising one or several intermediate metal products, each one with intermediate characteristics, and the metal product whose manufacturing is monitored being the final metal product, the metal product being chosen from among the group consisting of: a slab, a coil, a beam, a bloom, a billet, and a steel product, the monitoring method being implemented by an electronic monitoring device and comprising the following steps:
  acquiring a measured value of at least one representative parameter, each representative parameter being a parameter relating to the metal product or a parameter relating to the manufacturing process,
  determining a status of the metal product among a compliant status and an analysis status, depending on the at least one acquired value and on at least one target, and
  when the determined status is the analysis status, computing a corrective action to be applied to the product, among a set of corrective actions and depending on the at least one acquired value, the set of corrective actions including a product repair, a product downgrading, a product expertise and a product acceptance.

According to other advantageous aspects of the present disclosure, the method comprises one or several of the following features, taken individually or according to any technically possible combination:
  the set of corrective actions consists of the product repair, the product downgrading, the product expertise and the product acceptance;
  the method further comprises a step of validating the at least one acquired value according to a coherence test, the status of the product being then determined on the basis of the value(s) which have been validated from among the acquired value(s);
  the method further comprises a step of modeling at least one characteristic of the metal product from the at least one value which have been validated from among the acquired value(s), the status of the product being determined further on the modeled characteristic(s);

each parameter relating to the metal product is a parameter from among the group consisting of: a parameter relating to mechanical properties of the product, a parameter relating to a roughness of the product, a parameter relating to a chemical composition of the product, a parameter relating to the properties of a coating of the product, a parameter relating to dimensions of the product, a parameter relating to a surface aspect of the product and a parameter relating to defectology of the product;

each parameter relating to the manufacturing process is a parameter depending on the type of the manufacturing process, such as a hot dip galvanizing process or a hot rolling process;

if the manufacturing process is a hot dip galvanizing process, each parameter relating to the manufacturing process is chosen from among the group consisting of: a parameter relating to an annealing furnace, a parameter relating to a snout, a parameter relating to a coating bath and a parameter relating to a skin pass; and if the manufacturing process is a hot rolling process, each parameter relating to the manufacturing process is chosen from among the group consisting of: a parameter relating to a reheating furnace, a parameter relating to a roughing mill, a parameter relating to a finishing mill, a parameter relating to a run-out table and a parameter relating to a coiler;

the step of determining the status of the metal product comprises comparing at least one acquired value with a respective predefined compliant range of values, each respective predefined compliant range of values depending on the corresponding at least one target, the determined status being the compliant status if said acquired value(s) belong to the respective predefined compliant range(s) of values, the determined status being otherwise the analysis status;

the step of computing the corrective action comprises comparing at least one acquired value with a respective predefined acceptability range of values, each respective predefined acceptability range of values depending on the corresponding at least one target and including the corresponding predefined compliant range of values, for at least one parameter the predefined acceptability range strictly including the predefined compliant range, the computed corrective action being equal to the product expertise if the metal product is tagged as a specific product or the corresponding parameter is tagged as specific and if said acquired value(s) belong to the respective predefined acceptability range(s) of values;

the computed corrective action is equal to the product acceptance if the metal product is not tagged as a specific product and the corresponding parameter is not tagged as specific and if said acquired value(s) belong to the respective predefined acceptability range(s) of values;

the step of computing the corrective action comprises comparing at least one acquired value with a respective predefined acceptability range of values, each respective predefined acceptability range of values depending on the corresponding at least one target and being disjoint from the corresponding predefined compliant range of values, the computed corrective action being equal to the product expertise if the metal product is tagged as a specific product or the corresponding parameter is tagged as specific and if said acquired value(s) belong to the respective predefined acceptability range(s) of values;

the computed corrective action is equal to the product acceptance if the metal product is not tagged as a specific product and the corresponding parameter is not tagged as specific and if said acquired value(s) belong to the respective predefined acceptability range(s) of values;

the step of computing the corrective action comprises identifying an abnormality event for each acquired value outside the respective predefined acceptability range of values, the computed corrective action then depending on the worst abnormality event(s), the worst abnormality event(s) being the one(s) with the greatest deviation with respect to the corresponding predefined acceptability range of values;

the step of computing the corrective action comprises comparing at least one acquired value with a respective predefined acceptability range of values and identifying an abnormality event for each acquired value outside the respective predefined acceptability range of values, each abnormality event is associated to an elementary zone of the metal product, the elementary zone having a length along the longitudinal direction, each elementary zone with at least one abnormality event being identified as an abnormality elementary zone, and when the cumulated length of all the abnormality elementary zones is greater than a predefined percentage of the length of the metal product, the computed corrective action is a product downgrading, otherwise, when the cumulated length of all the abnormality elementary zones is lower than or equal to said predefined percentage of the length of the metal product, the computed corrective action is a product repair;

the product repair comprises cutting each abnormality elementary zone;

if the cut abnormality elementary zone is not at one end of the metal product, the product repair further comprises welding the parts of the metal product that are on both sides of the cut abnormality elementary zone.

The subject-matter of the present disclosure is also a non-transitory computer-readable medium comprising a computer program including software instructions which, when executed by a processor, implement a method as defined above.

The subject-matter of the present disclosure is also an electronic monitoring device for monitoring a manufacturing of a metal product, the metal product being manufactured according to a manufacturing process, the manufacturing process including a manufacturing route for obtaining a final metal product with final characteristics, the manufacturing route comprising one or several intermediate metal products, each one with intermediate characteristics, and the metal product whose manufacturing is monitored being the final metal product, the metal product being chosen from among the group consisting of: a slab, a coil, a beam, a bloom, a billet, and a steel product, the electronic monitoring device comprising:

an acquisition module configured for acquiring a measured value of at least one representative parameter, each representative parameter being a parameter relating to the metal product or a parameter relating to the manufacturing process, a determination module configured for determining a status of the metal product among a compliant status and an analysis status, depending on the at least one acquired value and on at least one target, and a computation module configured for, when the determined status is the analysis status, computing a corrective action to be applied to the product, among a set of corrective actions and depending on the at least one acquired value, the set of corrective actions including a product repair, a product downgrading, a product expertise and a product acceptance.

The subject-matter of the present disclosure is also an installation for delivering a metal product, the installation comprising:

a manufacturing line for manufacturing the metal product according to a manufacturing process, and an electronic monitoring device for monitoring the manufacturing of the metal product, wherein the electronic monitoring device is as defined above.

BRIEF DESCRIPTION OF THE DRAWINGS

The present disclosure will be better understood upon reading of the following description, which is given solely by way of example and with reference to the appended drawings, wherein.

DETAILED DESCRIPTION OF PREFERRED EMBODIMENTS

In the following of the description, the expression "substantially equal to" defines a relation of equality to plus or minus 10%, preferably to plus or minus 5%.

Figure 1:
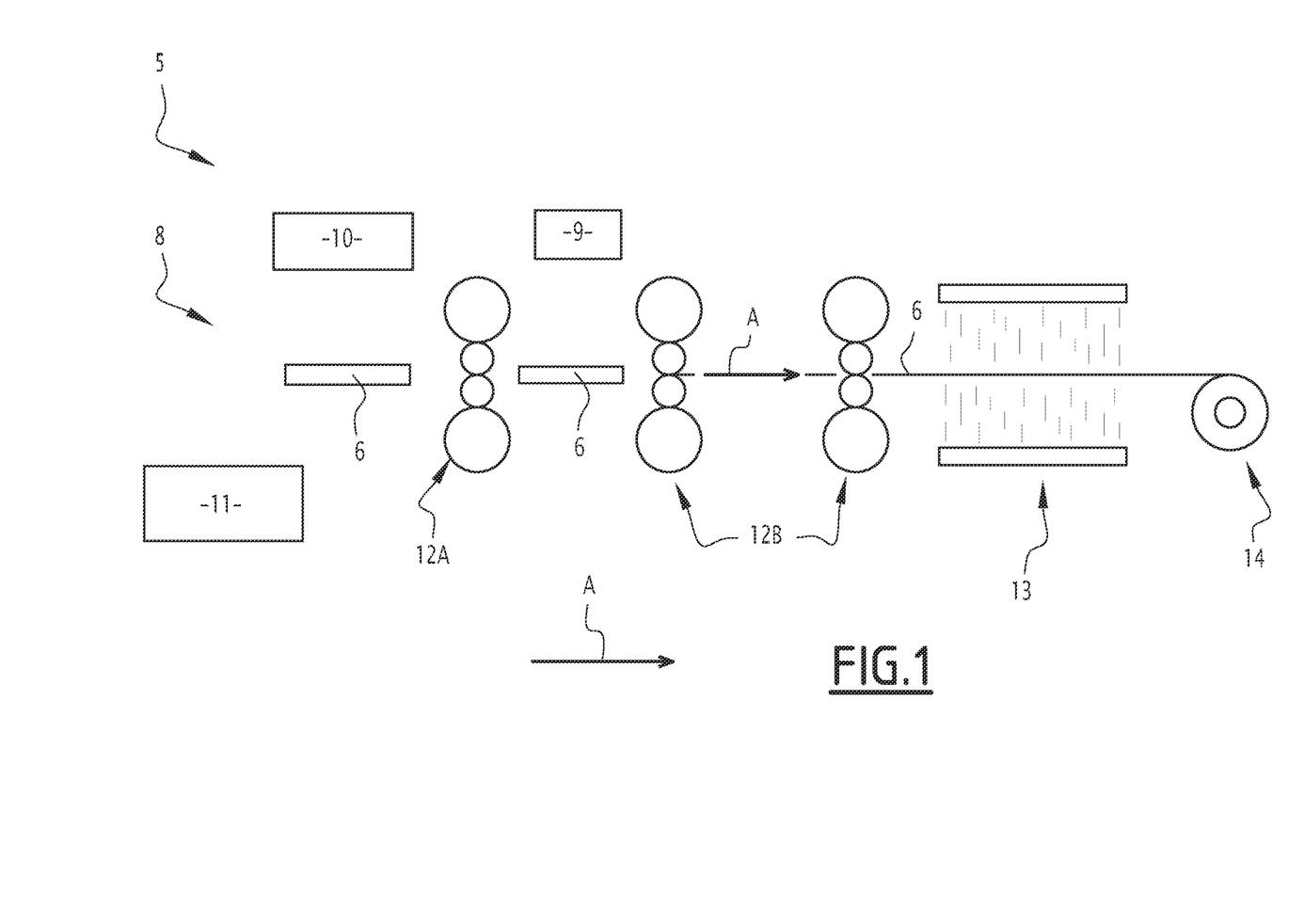
FIG. 1 is a schematic illustration of an installation for delivering a metal product, the installation comprising a manufacturing line for manufacturing the metal product and an electronic monitoring device for monitoring the manufacturing of the metal product, according to a first embodiment wherein the manufacturing line is a hot-rolling line.
Figure 2:
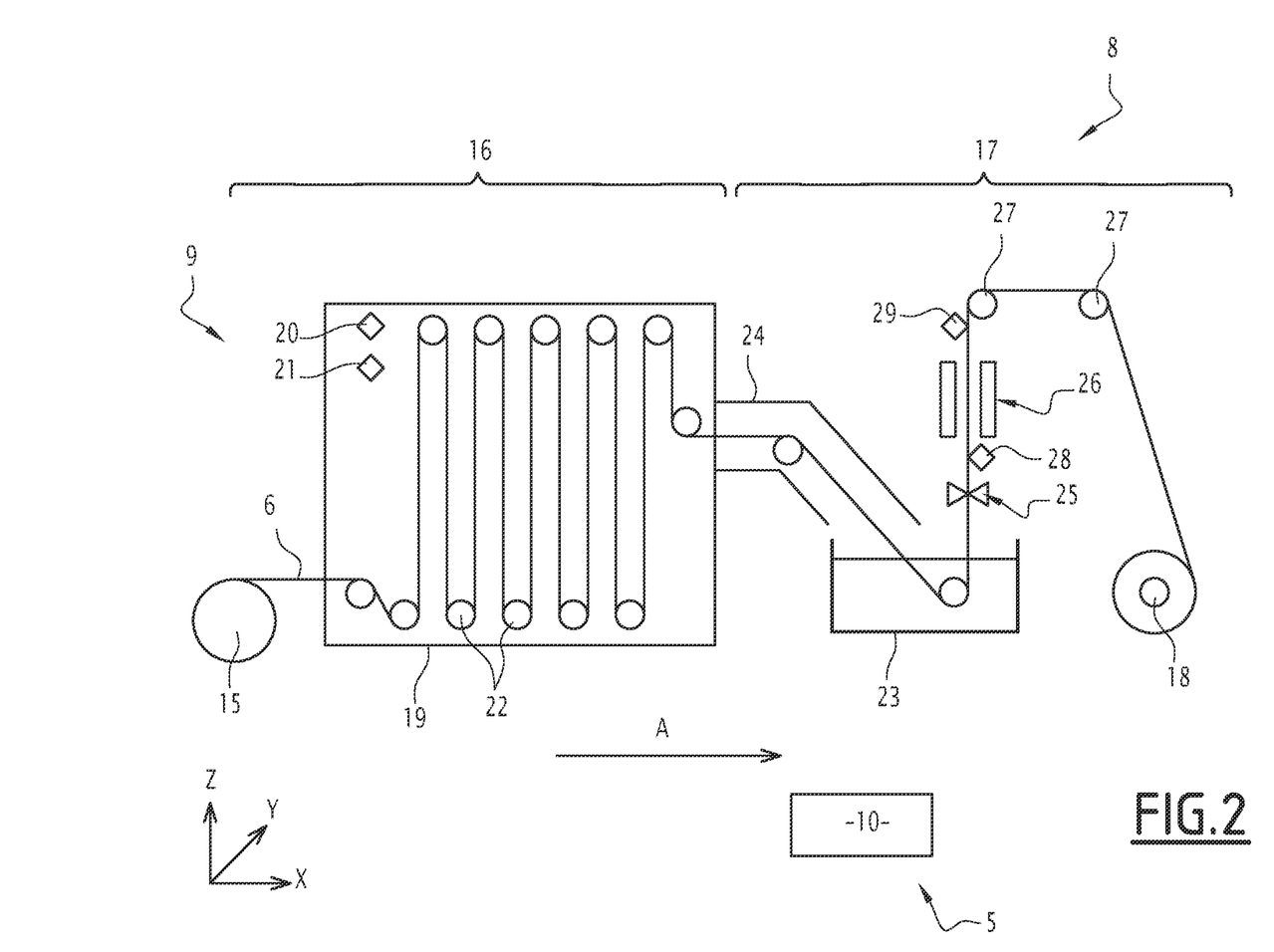
FIG. 2 is a schematic illustration similar to the one of FIG. 1, according to a second embodiment wherein the manufacturing line is a galvanization line.

In FIGS. 1 and 2, an installation 5 for delivering a metal product 6 comprises a manufacturing line 8 for manufacturing the metal product 6 and an electronic monitoring device 10 for monitoring the manufacturing of the metal product 6.

The manufacturing line 8 includes a set 9 of sensors, each sensor being adapted for measuring value(s) of at least one representative parameter, each representative parameter being a parameter relating to the metal product 6 or a parameter relating to the manufacturing process. The electronic monitoring device 10 is connected to the set 9 of sensors and configured for using the value(s) of the representative parameter(s) provided by the set 9 of sensors.

The manufacturing process includes a manufacturing route for obtaining a final metal product with final characteristics, the manufacturing route comprising one or several intermediate metal products, each one with intermediate characteristics.

The metal product 6 is chosen from among the group consisting of: a slab, a coil, a beam, a bloom, a billet, and a steel product.

The metal product 6 whose manufacturing is monitored is among the final metal product and the one or several intermediate metal products.

In the example of FIG. 1, the manufacturing line 8 is a hot-rolling line for delivering the metal product 6, for example a metal strip, such as a hot-rolled steel strip, the hot-rolling line including a furnace 11, a succession of rolling mills 12A, 12B, in particular a roughing mill 12A followed by one or several finishing mill 12B, a cooling apparatus 13 for cooling the metal product 6 and a coiler 14. The furnace 11, the rolling mills 12A, 12B, the cooling apparatus 13 and the coiler 14 are known per se.

The metal product 6, on discharge from the furnace 11, is moved in a running direction A through the rolling mills 12A, 12B. For example, the running direction A of the product 6 is substantially horizontal.

The metal product 6 then passes through the cooling apparatus 13, in which the strip is cooled from an initial temperature, which is for example substantially equal to the temperature at the end of the rolling of the strip, down to a final temperature which is for example room temperature, i.e. about 20° C.

The metal product 6 passes through the cooling apparatus 13 in the running direction A at a running speed which is preferably comprised between 1 m/s and 25 m/s.

The metal product 6 has for example a thickness comprised between 1 mm and 30 mm.

The initial temperature is for example greater than or equal to 600° C., notably greater than or equal to 800° C., or even greater than 1000° C.

In the cooling apparatus 13, such as a run-out table, at least one first cooling fluid jet is ejected on a top surface of the metal product 6, and at least one second cooling fluid jet is ejected on a bottom surface of the metal product 6. The cooling fluid, also called coolant, is for example water.

The metal product 6 is finally arranged into a metal coil by the coiler 14.

In the example of FIG. 2, the manufacturing line 8 is a hot-dip galvanization line for coating the metal product 6, such as a steel strip, the hot-dip galvanization line including a decoiler 15, an annealing device 16, a coating device 17 and a coiler 18.

The annealing device 16 comprises a furnace 19, equipped for example with a first sensor 20 for measuring the temperature of the metal product 6 and a second sensor 21 for determining the composition of the atmosphere inside the furnace 9. The annealing device 16 also includes first rollers 22 for guiding the metal product 6, i.e. the strip.

The coating device 17 comprises a bath 23 of molten metal, the molten metal being for example zinc, a snout 24 making it possible to avoid the contact of the strip with outside air between the exit of the furnace 19 and the entry into the bath 23. The coating device 17 also includes a wiping device 25 and a cooling device 26.

The coating device 17 also comprises second rollers 27 for guiding the metal product 6. The coating device 17 is also equipped with a third sensor 28 for measuring the coating thickness on the strip after wiping, and a fourth sensor 29 for measuring the strip temperature after cooling.

In the example of FIG. 2, the set 9 of sensors therefore includes the first sensor 20, the second sensor 21, the third sensor 28 and the fourth sensor 29.

In the following of the description, the selected orientations are indicative and are meant with respect to the Figures. In particular, the terms of «upstream» and «downstream» are meant relatively to the orientation selected in the Figures. These terms are used with respect to the running metal product 6. Moreover, the terms of «transverse», «longitudinal» and «vertical» should be understood with respect to the running direction A of the metal product 6, which is a longitudinal direction. In particular, the term of «longitudinal» refers to a direction parallel to the running direction A of the metal product 6, the term of «transverse» refers to a direction orthogonal to the running direction A of the metal product 6 and contained in a plane parallel to the top and bottom surfaces of the metal product 6, and the term of «vertical» refers to a direction orthogonal to the running direction A of the metal product 6 and orthogonal to the top and bottom surfaces of the metal product 6.

Furthermore, by «length» a dimension of an object in the longitudinal direction will be referred to, by «width» a dimension of an object in a transverse direction, and by «thickness» a dimension of an object in a vertical direction.

The longitudinal, transverse and vertical directions are also represented in FIG. 2 respectively via a longitudinal axis X, a transversal axis Y and a vertical axis Z.

Figure 3:
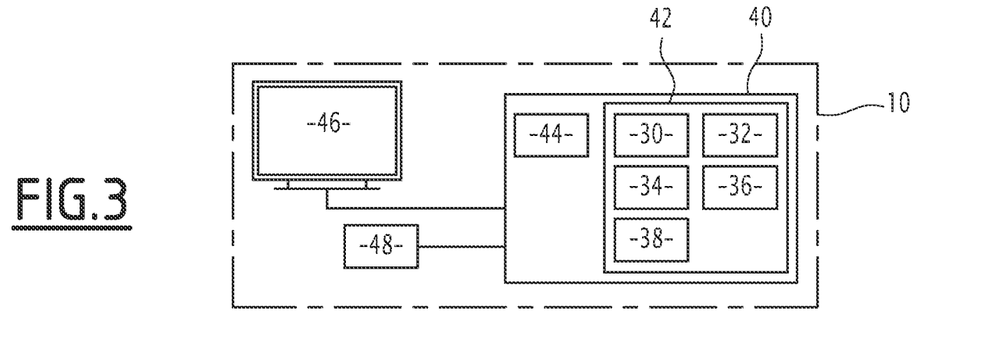
FIG. 3 is a schematic illustration of the electronic monitoring device of FIG. 1 or 2.

The electronic monitoring device 10 comprises an acquisition module 30 configured for acquiring a measured value of at least one representative parameter, each representative parameter being a parameter relating to the metal product 6 or a parameter relating to the manufacturing process.

The electronic monitoring device 10 comprises a determination module 32 configured for determining a status of the metal product 6 among a compliant status and an analysis status, depending on the at least one acquired value and on at least one target.

The electronic monitoring device 10 comprises a computation module 34 configured for, when the determined status is the analysis status, computing a corrective action to be applied to the product 6, among a set of corrective actions and depending on the at least one acquired value.

In a preferred embodiment, the electronic monitoring device 10 comprises a validation module 36 configured for validating the at least one acquired value according to a coherence test. According to this preferred embodiment, the determination module 32 is configured for determining the status of the product 6 on the basis of the value(s) which have been validated from among the acquired value(s).

In a preferred embodiment, the electronic monitoring device 10 comprises a modeling module 38 configured for modeling at least one characteristic of the metal product 6 from the at least one acquired value, preferably from value(s) which have been validated from among the acquired value(s). According to this preferred embodiment, the determination module 32 is configured for determining the status of the product 6 further on the modeled characteristic.

The term "modeling" refers to a numerical simulation, such as a simulation run on a computer.

In the example of FIG. 3, the electronic monitoring device 10 includes a processing unit 40 formed for example of a memory 42 and of a processor 44 coupled to the memory 42. In this example, the electronic monitoring device 10 also includes a display screen 46 and input/output means 48, such as a keyboard and a mouse, each being connected to the processing unit 40.

In the example of FIG. 3, the acquisition module 30, the determination module 32 and the computation module 34, and in a preferred embodiment the validation module 36 and the modeling module 38, are for example each realized, i.e. implemented, as a software executable by the processor 44.

The memory 42 of the processing unit 40 is adapted to store an acquisition software configured for acquiring the measured value of at least one representative parameter, each representative parameter being a parameter relating to the metal product 6 or a parameter relating to the manufacturing process; a determination software configured for determining the status of the metal product 6 among the compliant status and the analysis status, depending on the at least one acquired value and on at least one target; and a computation software configured for, when the determined status is the analysis status, computing the corrective action to be applied to the product 6, among the set of corrective actions and depending on the at least one acquired value. In a preferred embodiment, the memory 42 of the processing unit 40 is adapted to store a validation software configured for validating the at least one acquired value according to a coherence test, the determination software being then configured for determining the status of the product 6 on the basis of the value(s) which have been validated from among the acquired value(s); and a modeling software configured for modeling at least one characteristic of the metal product 6 from the at least one acquired value, preferably from value(s) which have been validated from among the acquired value(s), the determination software being then configured for determining the status of the product 6 further on the modeled characteristic. The processor 44 of the processing unit 40 is then configured to execute the acquisition software, the determination software and the computation software, and in a preferred embodiment the validation software and the modeling software.

As a variant not shown, the acquisition module 30, the determination module 32 and the computation module 34, and in a preferred embodiment the validation module 36 and the modeling module 38, are each in the form of a programmable logic component, such as a Field Programmable Gate Array or FPGA, or in the form of a dedicated integrated circuit, such as an Application Specific integrated Circuit or ASIC.

When the electronic monitoring device 10 is in the form of one or more software programs, i.e. in the form of a computer program, it is also capable of being recorded on an computer-readable medium, not shown. The computer-readable medium is, for example, a medium capable of storing electronic instructions and being coupled to a bus of a computer system. For example, the readable medium is an optical disk, a magneto-optical disk, a ROM memory, a RAM memory, any type of non-volatile memory (for example EPROM, EEPROM, FLASH, NVRAM), a magnetic card or an optical card. A computer program with software instructions is then stored on the readable medium.

The acquisition module 30 is configured for acquiring a measured value of the at least one representative parameter, and each representative parameter is a parameter relating to the metal product 6 or relating to the manufacturing process. The acquisition module 30 is connected to the set 9 of sensors and the acquired value(s) are preferably value(s) measured by corresponding sensor(s) of the set 9.

Each parameter relating to the metal product is a parameter from among the group consisting of: a parameter relating to mechanical properties of the product, a parameter relating to a roughness of the product, a parameter relating to a chemical composition of the product, a parameter relating to the properties of a coating of the product, a parameter relating to dimensions of the product, a parameter relating to a surface aspect of the product, a parameter relating to defectology of the product.

The parameter relating to the mechanical properties of the metal product 6 is, for example, chosen from the group consisting of: a yield strength in a given direction, such as the longitudinal direction or the transversal direction; a tensile strength in a given direction, such as the longitudinal direction or the transversal direction; a elongation to fracture in a given direction, such as the longitudinal direction or the transversal direction; a plastic-strain ratio in a given direction, such as the longitudinal direction or the transversal direction; a yield point elongation in a given direction, such as the longitudinal direction or the transversal direction; a strain hardening exponent; a bake hardening in a given direction, such as the longitudinal direction or the transversal direction; and a product hardness.

The parameter relating to the roughness of the metal product 6 is, for example, chosen from the group consisting of: a roughness for a predefined cutoff, such as a cutoff of 0.8 mm or of 2.5 mm, for a given side of the metal product 6, such as a top side or a bottom side; a number of peaks per distance for a predefined threshold, such as a threshold of 0.5 µm or of 0.625 µm; a texture; a maximal roughness for a given side of the metal product 6, such as a top side or a bottom side; a minimal roughness for a given side of the metal product 6, such as a top side or a bottom side.

The parameter relating to the chemical composition of the metal product 6 is, for example, chosen from the group consisting of: a percentage of aluminum, a percentage of arsenic, a percentage of boron, a percentage of carbon, a percentage of calcium, a percentage of cobalt, a percentage of chromium, a percentage of copper, a percentage of hydrogen, a percentage of manganese, a percentage of molybdenum, a percentage of nitrogen, a percentage of niobium, a percentage of nickel, a percentage of oxygen, a percentage of phosphorus, a percentage of lead, a percentage of sulfur, a percentage of silicon, a percentage of antimony, a percentage of tin, a percentage of titanium, a percentage of vanadium and a percentage of zirconium, in the composition of the metal product 6. Percentages are expressed in volume, mass or moles.

The parameter relating to the coating property or properties of the metal product 6 is, for example, chosen from the group consisting of: a chemical composition of the coating; a coating thickness; a percentage of iron contained in the coating; a powdering of a given side of the metal product 6, such as a top side or a bottom side; a minimum thickness of the coating; a maximum thickness of the coating.

The parameter relating to the dimensions of the metal product 6 is, for example, chosen from the group consisting of: a product crown; a product wedge; a product flatness deviation; a product thickness; a product width; a product length; a product flatness; a product weight.

The parameter relating to the surface aspect of the metal product 6 is, for example, chosen from the group consisting of: a blistered aspect of a given surface, such as a top surface or a bottom surface, of the product; an exfoliated aspect of a given surface of the product, a cleanness index of a given surface of the product; a stoning of a given surface of the product; a gloss of the product; a reflectance of the product; a hue of the product; a waviness W08 value for a given side of the metal product 6, such as a top side or a bottom side; and a waviness W25 value for a given side of the metal product 6, such as a top side or a bottom side.

The parameter relating to the defectology of the metal product 6 is, for example, chosen from the group consisting of a defect type, a defect dimension, a defect location on the metal product 6.

In a preferred embodiment, the set of sensors 11 includes a surface inspection device, such as the one described in published documents FR 2 761 474 A1, FR 2 761 475 A1 and FR 2 761 476 A1. In this preferred embodiment, the parameter relating to the defectology of the metal product and/or the parameter relating to a surface aspect of the metal product is detected and measured by the surface inspection device.

Each parameter relating to the manufacturing process is, for example, a parameter from among the group consisting of: a parameter relating to manufacturing conditions, such as a manufacturing temperature, a manufacturing speed and/or a manufacturing duration; a parameter relating to a used equipment.

All following parameters will be given as a matter of example to illustrate which type of parameters could be considered when applying a method according to the present disclosure to a specific manufacturing line. They are not exhaustive lists.

If the manufacturing process is a hot dip galvanizing process then each parameter relating to the manufacturing process is, for example, a parameter from among the group consisting of: a parameter relating to the annealing furnace, a parameter relating to the snout, a parameter relating to the coating bath or a parameter relating to the skin pass.

The parameter relating to the annealing furnace is, for example, chosen among a strip temperature, a strip speed, a dew point of the atmosphere within the furnace, a gas injection flow rate within the furnace.

The parameters relating to the snout is, for example, chosen among a gas injection flow rate within the snout, a zinc level within the snout, a strip temperature.

The parameters relating to the coating bath is, for example, chosen among a bath composition, a bath temperature, a strip temperature.

The parameters relating to the skin pass is, for example, chosen among an elongation, a tensile strength applied to the strip, a cylinder type, a cylinder diameter, a cylinder roughness, a cylinder state of wear, a clamping force.

If the manufacturing process is a hot rolling process then each parameter relating to the manufacturing process is, for example, a parameter relating to the reheating furnace, a parameter relating to the roughing mill, a parameter relating to the finishing mill, a parameter relating to the Run-Out Table or a parameter relating to the coiler.

The parameter relating to the reheating furnace is, for example, chosen from the group consisting of: a slab temperature, a combustion gas composition, a combustion gas flow rate, a heating duration.

The parameter relating to the roughing mill is, for example, chosen from the group consisting of: a metal product thickness, a metal product speed, a number of stands, a diameter of the cylinders, a lubricant flow rate, The parameter relating to the finishing mill is, for example, chosen from the group consisting of: a strip thickness, a strip speed, a number of stands, a diameter of the cylinders, a lubricant flow rate, a cooling medium flow rate, a strip temperature, a coupling force.

The parameter relating to the run-out table is, for example, chosen from the group consisting of: a cooling flow rate, a strip speed, a strip temperature, a phase fraction of the steel strip, a length of the run-out table, a distance between the cooling device and the strip.

The parameter relating to the coiler is, for example, chosen from the group consisting of: a coiling speed, a mandrel diameter, a coiling temperature.

The acquisition module 30 is therefore adapted for acquiring values measured by the sensor set 9 for some or all of the aforementioned parameters. The acquisition module 30 is, for example, adapted to classify these measured values into tables, each table being associated with a respective parameter.

The determination module 32 is configured for determining the status of the metal product 6 among a compliant status and an analysis status, depending on the at least one value acquired by the acquisition module 30 and on at least one target.

The determination module 32 is for example configured for determining the status of the metal product 6 by comparing at least one acquired value with a respective predefined compliant range of values, and preferably by comparing several acquired values with respective predefined compliant ranges of values. The determined status is equal to the compliant status if said acquired value(s) belong to the respective predefined compliant range(s) of values.

Otherwise, if the acquired value for at least one parameter does not belong to the respective predefined compliant range of values, then the determined status is equal to the analysis status. The analysis status is therefore a status requiring a further analysis as it will be described hereinafter, this further analysis being carried out by the computation module 34.

The compliant ranges of values are for example predefined for each type of metal product 6. The type of the metal product 6 is preferably chosen from the group consisting of: a slab product; a hot-rolled product; a cold-rolled product; a hot-dip coated product; an electro-galvanized product; an organic coated product; and a packaging product.

In a preferred embodiment, the compliant ranges of values are predefined for each customer.

The compliant range of values depends on the corresponding at least one target for the respective parameter. The skilled person will therefore understand that the compliant ranges of values are predefined according to expected, i.e. desired, characteristics of the metal product 6, in particular of the final product. The process to predefine compliant ranges of values according to the expected value(s) (also called target) of the metal product 6 is well-known.

A target is for example predefined for each respective parameter. The target is generally a range of values or alternatively a single value. In other words, the target generally corresponds to a range of expected values for a respective parameter, or alternatively to a single expected value.

When the determined status is the analysis status, the computation module 34 is configured for computing the corrective action to be applied to the product 6, among the set of corrective actions and depending on the at least one acquired value.

The set of corrective actions includes a product repair, a product downgrading, a product expertise and a product acceptance. The set of corrective actions preferably consists of the product repair, the product downgrading, the product expertise and the product acceptance.

The computation module 34 is for example configured for computing the corrective action by comparing at least one acquired value with a respective predefined acceptability range of values, and preferably by comparing several acquired values with respective predefined acceptability ranges of values. The computed corrective action is equal to the product expertise if said acquired value(s) belong to the respective predefined acceptability range(s) of values while the metal product 6 is tagged as a specific product or the corresponding parameter is tagged as specific. The computed corrective action is equal to the product acceptance if said acquired value(s) belong to the respective predefined acceptability range(s) of values, if the metal product 6 is not tagged as a specific product and if the corresponding parameter is not tagged as specific. The corresponding parameter is the parameter relating to the metal product 6 or relating to the manufacturing process for which said comparison between the at least one acquired value and the respective predefined acceptability range of values is done.

The predefined acceptability range of values includes for example the corresponding predefined compliant range of values. For at least one parameter, the predefined acceptability range strictly includes the predefined compliant range. In other words, for at least one parameter, the predefined acceptability range is wider than the predefined compliant range, i.e. the predefined acceptability range includes strictly more values than the predefined compliant range.

Alternatively, the predefined acceptability range of values is disjoint from the corresponding predefined compliant range of values. For example, the predefined compliant range of values corresponds to a median range of values while the predefined acceptability range of values corresponds to an adjacent range of values or a pair of adjacent ranges of values, each adjacent range being typically adjacent to a corresponding extreme value of said predefined compliant range.

In a similar manner to the compliant ranges of values, the acceptability ranges of values are for example predefined for each type of metal product 6.

In optional addition, the acceptability ranges of values are predefined for each customer.

The skilled person will therefore understand that the acceptability ranges of values are predefined according to margins with respect to expected, i.e. desired, value(s) of the metal product 6, in particular of the final product. In other words, the acceptability range of values depends on the corresponding at least one target for the respective parameter.

The acceptability range of values is for example predefined by applying a percentage, such as 20%, preferably 10%, more preferably 5%, to each extreme value of the corresponding compliant range of values.

Alternatively, the acceptability range of values is predefined by applying a deviation to each extreme value of the corresponding compliant range of values.

In optional addition, the skilled person will also observe that, for some parameters (also called critic parameters) among the aforementioned parameters relating to the metal product 6 or relating to the manufacturing process, the acceptability range of values is equal to the compliant range of values. In other words, no deviation is tolerated for the or these critic parameters and if a deviation is measured with respect to the compliant range of values for said critic parameter(s), the computed corrective action differs from the product acceptance.

The computation module 34 is for example configured for identifying an abnormality event for each acquired value outside the respective predefined acceptability range of values, the computed corrective action then depending on the worst abnormality event(s), the worst abnormality event(s) being the one(s) with the greatest deviation with respect to the corresponding predefined acceptability range of values.

Each deviation associated with a respective abnormality event is for example evaluated by determining a ratio of a value delta with respect to the width of the respective predefined acceptability range, the delta value being equal to the difference between the acquired value and a nearest extreme value of the acceptability range. The nearest extreme value of the acceptability range is the one among the two extreme values of the acceptability range which is the nearest to the acquired value. Alternatively, each deviation is evaluated by determining a ratio of the acquired value with respect to a median value of the respective predefined acceptability range. As another alternative, each deviation is evaluated by determining a ratio of the acquired value with respect to the nearest extreme value of the acceptability range. The greatest deviation(s) then correspond to the greatest ratio(s).

In optional addition, each abnormality event is associated to an elementary zone of the metal product 6, the elementary zone having a length along the longitudinal direction. Each elementary zone with at least one abnormality event is identified as an abnormality elementary zone. Further, if the cumulated length of all the abnormality elementary zones is greater than a predefined percentage of the length of the metal product 6, then the computed corrective action is a product downgrading. Otherwise, if the cumulated length of all the abnormality elementary zones is lower than or equal to said predefined percentage of the length of the metal product 6, then the computed corrective action is a product repair. The predefined percentage of the length of the metal product 6 is for example substantially equal to 30%.

In optional addition, if the metal product 6 is tagged as a specific product, such as a safety product, and if the acquired values correspond to the product acceptance (i.e. the acquired value belong to the respective predefined acceptability range of values, but not to the respective predefined compliant range of values), then the computation module 34 is configured for computing the corrective action as equal to the product expertise, as described above. A safety product is for example a safety metal component of a motor vehicle, such as A and B-pillars.

In optional addition, if at least one parameter is tagged as specific, with an acquired value outside the respective predefined compliant range of values and inside respective predefined acceptability range of values for said specific parameter, and if the acquired values correspond to the product acceptance, then the computation module 34 is configured for computing the corrective action as equal to the product expertise. Some parameter(s) are for example tagged as specific when they are of greater importance for the customer, such a parameter relating to the roughness of the metal product 6 for a customer in the automobile field.

In optional addition, the validation module 36 is configured for validating the at least one acquired value according to a coherence test. According to this optional addition, the determination module 32 is configured for determining the status of the product 6 on the basis of the value(s) which have been validated from among the acquired value(s).

The coherence test includes for example a comparison of the acquired values with respect to a predefined threshold according to characteristics of the corresponding sensor, such as characteristics provided by the sensor manufacturer or such as characteristics defined according to the sensor operating range.

Alternatively, or in addition, the coherence test includes a comparison between values acquired successively over time by the same sensor, such a comparison being adapted to reveal glaring anomalies. For example, the validation module 36 is configured for detecting a constancy of the acquired values, tending to show that the sensor no longer functions correctly or that a failure has occurred on the connection between the corresponding sensor and the monitoring device 16.

Alternatively, or in addition, the coherence test includes deleting the acquired values that deviate too far from minimum and maximum setpoints related to the corresponding sensor.

Alternatively, or in addition, the coherence test includes verifying that the acquired values correspond to a normal operation of the manufacturing line by defining minimum and maximum limits for the considered parameter and the coherence test then includes invalidating each value deviating from the authorized range between said minimum and maximum limits.

Alternatively, or in addition, the coherence test includes comparing values measured simultaneously or successively by different sensors, while having a functional link to check their coherence. For example, the parameter, such as a temperature metal product 6, is measured in two successive zones and the coherence test includes verifying that the parameter variation does not exceed a given predefined threshold. If the deviation exceeds this threshold, then the validation module 36 is configured for invalidating both acquired values according to the coherence test.

Alternatively, or in addition, the consistency test includes verifying that the acquired values belong to a range of validity of one or several metallurgical models, the metallurgical models being used to calculate use characteristics of metal product 6.

In optional addition, the validation module 36 is configured for generating an alert signal, such as the display of a visual signal, if acquired values are invalidated according to the coherence test.

In optional addition, the validation module 36 is configured for replacing incoherent acquired values by values estimated according to an estimation model, such as linear interpolation.

In optional addition, the modeling module 38 is configured for modeling at least one characteristic of the metal product 6 from the at least one acquired value, preferably from value(s) which have been validated from among the acquired value(s). According to this optional addition, the determination module 32 is configured for determining the status of the product 6 further on the modeled characteristic.

When the acquired value is related to a respective intermediate metal product, the modeling module 38 is for example configured for modeling the final metal product and for estimating the value of the final metal product corresponding to the acquired value of the intermediate metal product.

Alternatively, or in addition, the modeling module 38 is configured for predicting a value of a parameter of the metal product 6 based on value(s) of other parameter(s) of the metal product 6 and on a prediction model. The modeling module 38 is for example configured for predicting a value of a mechanical property of the metal product 6 based on value(s) of chemical analysis and of process parameter(s). The modeling module 38 therefore allows to access in an easier manner values in the center of the metal product 6, while tensile strength measurement for example only accesses those at the extremities, which are often influenced by transitory effects. It also allows to speed up the monitoring of the metal product 6.

Figure 4:
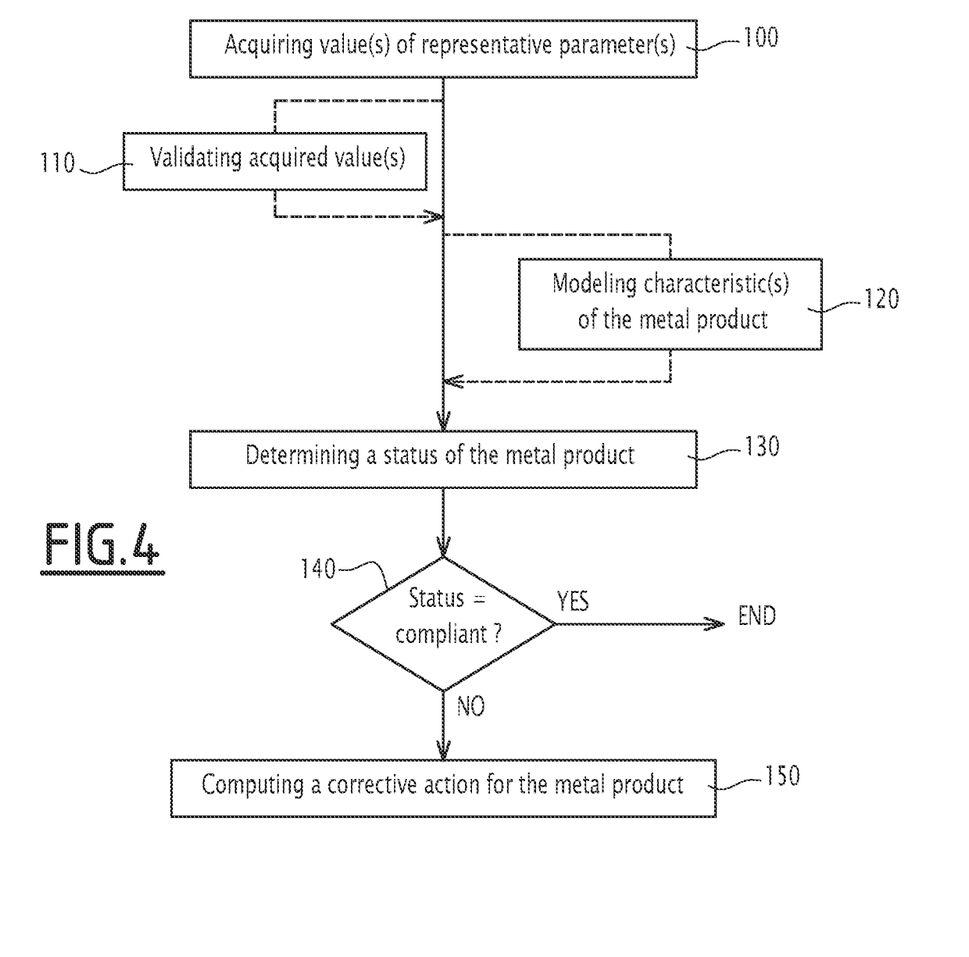
FIG. 4 is a flowchart of a method, according to the present disclosure, for monitoring a manufacturing of a metal product, the monitoring method being implemented by the electronic monitoring device of FIG. 3.
Figure 5:
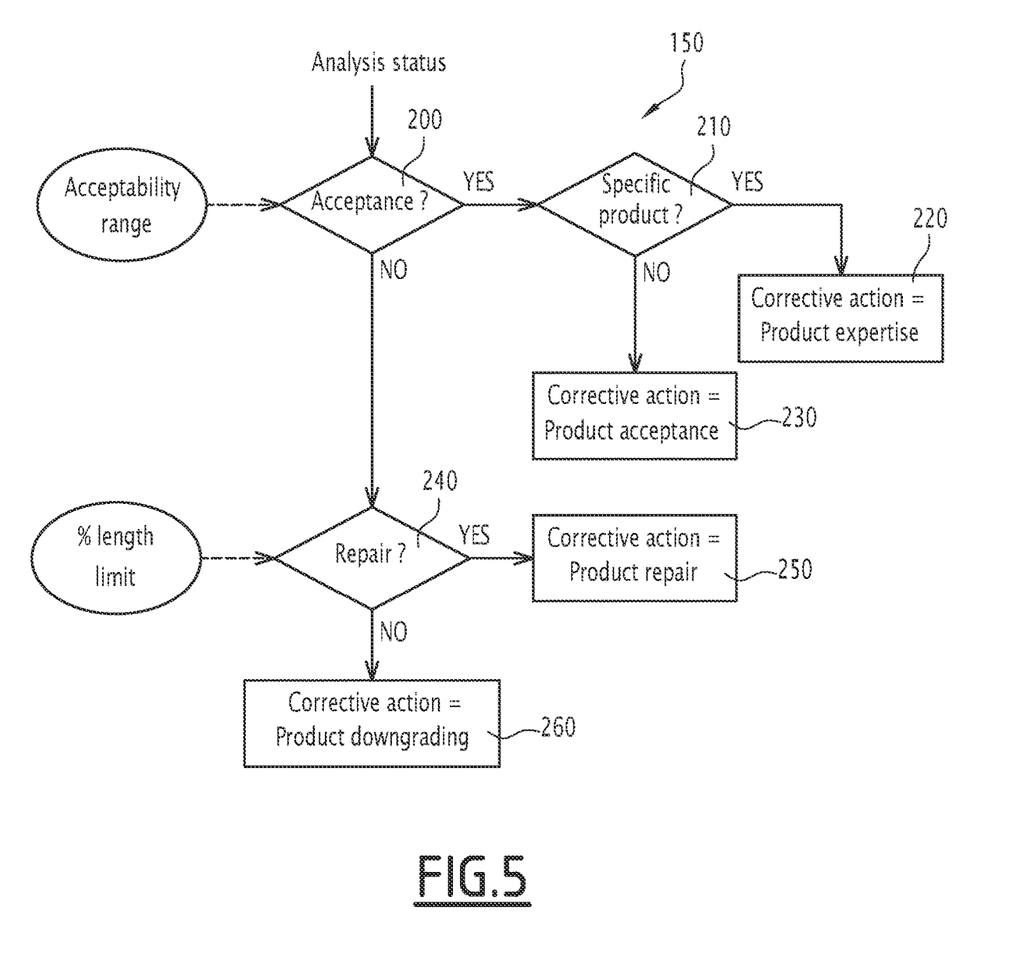
FIG. 5 is a flowchart representing a corrective action computing step of the flowchart of FIG. 4.

The operation of the electronic monitoring device 10 according to the present disclosure will now be explained in view of FIGS. 4 and 5 representing flowcharts of a method, according to the present disclosure, for monitoring the manufacturing of the metal product 6, the metal product 6 being manufactured according to the manufacturing process.

Initially, in step 100, the electronic monitoring device 10 acquires, via its acquisition module 30, measured value(s) of representative parameter(s), each representative parameter being a parameter relating to the metal product 6 or a parameter relating to the manufacturing process.

As previously explained, the parameters relate for example to mechanical properties, the roughness, the chemical composition, the coating, the lubrication, the dimensions and/or the surface aspect of the metal product 6.

Optionally, during the next step 110, the electronic monitoring device 10 validates, via its validation module 36, the at least one acquired value according to the coherence test, the status of the product being then determined during step 130 on the basis of the value(s) which have been validated from among the acquired value(s).

Further optionally, during the next step 120, the electronic monitoring device 10 models, via its modeling module 38, modeling at least one characteristic of the metal product 6 from the at least one acquired value, preferably from value(s) which have been validated from among the acquired value(s), and during step 130 the status of the product being then determined further on the modeled characteristic.

In the next step 130, the electronic monitoring device 10 determines, via its determination module 32, the status of the metal product 6 among the compliant status and the analysis status, depending on the at least one acquired value and on at least one target.

As explained above, the status of the metal product 6 is for example determined by comparing each acquired value with a respective predefined compliant range of values, the determined status being the compliant status if each acquired value belongs to the respective predefined compliant range of values.

During the next step 140, the determined status of the metal product 6 is checked by the electronic monitoring device 10. If the determined status is the compliant status, the manufactured metal product 6 is considered as compliant to the desired quality level and the monitoring method is therefore terminated.

Otherwise, if the determined status is the analysis status, the monitoring method goes to next step 150 wherein the electronic monitoring device 10 computes, via its computation module 34, the corrective action to be applied to the product, among a set of corrective actions and depending on the at least one acquired value.

As previously described, the set of corrective actions includes a product repair, a product downgrading, a product expertise and a product acceptance. The set of corrective actions preferably consists of the product repair, the product downgrading, the product expertise and the product acceptance.

As shown in FIG. 5 representing an example of successive sub-steps of the step 150, the step 150 for computing the corrective action comprises for example a sub-step 200 for determining if the acquired value(s), or where applicable the value(s) which have been validated from among the acquired value(s), correspond to an acceptance by comparing at least one acquired or validated value with at least one respective predefined acceptability range of values.

If said comparison(s) are positive, i.e. if the acquired or validated value(s) correspond to an acceptance, then the step 150 for computing the corrective action comprises a sub-step 210 for determining if the metal product 6 is tagged as a specific product or if one of the parameter(s) for which the comparison(s) of sub-step 200 have been done is tagged as specific.

If the determination of sub-step 210 is positive, i.e. if the metal product 6 is tagged as a specific product or the corresponding parameter is tagged as specific, then the corrective action is computed as being equal to the product expertise during next sub-step 220.

Otherwise, if the determination of sub-step 210 is negative, i.e. if the metal product 6 is not tagged as a specific product and the corresponding parameter is not tagged as specific, then the corrective action is computed as being equal to the product acceptance during sub-step 230.

If at the end of sub-step 200 said comparison(s) are negative, i.e. if the acquired or validated value(s) do not correspond to an acceptance, then the step 150 for computing the corrective action comprises a sub-step 240 for determining if the metal product 6 may be repaired.

This sub-step 240 for example includes identifying an abnormality event for each acquired or validated value outside the respective predefined acceptability range of values, and then associating each abnormality event to an elementary zone of the metal product 6, the elementary zone having a length along the longitudinal direction, each elementary zone with at least one abnormality event being identified as an abnormality elementary zone. Further, this sub-step 240 includes comparing the cumulated length of all the abnormality elementary zones with a predefined percentage of the length of the metal product 6.

If the determination of sub-step 240 is positive, meaning that the metal product 6 is determined as being reparable, i.e. if the cumulated length of all the abnormality elementary zones is lower than or equal to said predefined percentage of the length of the metal product 6, then the corrective action is computed as being equal to the product repair during sub-step 250. The product repair preferably comprises cutting each abnormality elementary zone. In addition, if the cut abnormality elementary zone is not at one end of the metal product 6, the product repair further comprises welding the parts of the metal product 6 that are on both sides of the cut abnormality elementary zone.

Otherwise, if the determination of sub-step 240 is negative, i.e. if the cumulated length of all the abnormality elementary zones is greater than said predefined percentage of the length of the metal product 6, then the corrective action is computed as being equal to the product downgrading during sub-step 260.

Thus, when the determined status is the analysis status, the electronic monitoring device 10 is therefore adapted to provide several possible corrective actions to be applied to the product, the set of corrective actions including at least the product repair, the product downgrading, the product expertise and the product acceptance.

The computer-implemented monitoring method and the electronic monitoring device 10 according to the present disclosure allow in particular to reduce the proportion of metal products 6 which are downgraded, i.e. rejected as non-compliant, or to be repaired, due to additional possible corrective actions, such as the product expertise and the product acceptance.

The following Table 1 provides an example of respective numbers of metal product coils with respect to the different results, i.e. compliant status or corrective actions further to the analysis status, obtained with the electronic monitoring device 10.

TABLE 1

| Manufacturing line number | Number of manufactured coils | Compliant Status | Product expertise | Product acceptance | Product repair & Product downgrading |
|---|---|---|---|---|---|
| 1 | 930 | 296 | 83 | 142 | 409 |
| 2 | 835 | 241 | 137 | 382 | 75 |
| 3 | 999 | 747 | 32 | 43 | 177 |
| 4 | 1713 | 177 | 13 | 753 | 770 |
| Total | 4477 | 1461 | 265 | 1320 | 1431 |
| Percentage | 100% | 32.6% | 5.9% | 29.5% | 32% |

The corrective action corresponding to the product acceptance represents almost 30% of the number of manufactured coils of metal product 6.

With a prior art monitoring method, the proportion of non-compliant products would have been significantly higher.

For the corrective action corresponding to the product acceptance, the below Table 2 provides an example of respective percentages of metal product coils with respect to the different categories of parameters relating to the metal product 6 taken into account for the computation of the corrective action.

TABLE 2

| Line number | Number of coils | Coating | Dimensions | Mechanical Properties | Roughness | Surface Aspect | Others |
|---|---|---|---|---|---|---|---|
| 1 | 930 | 7.7% | 14.3% | 9.6% | 6.3% | 29.6% | 32.5% |
| 2 | 835 | 41.1% | 22.5% | 23.3% | 0.1% | 2.2% | 10.9% |
| 3 | 999 | 12.9% | 18.8% | 3.4% | 5.3% | 21.0% | 38.5% |
| 4 | 1713 | 9.2% | 7.2% | 65.4% | 0.2% | 5.6% | 12.5% |

Table 2 shows that the most important category of parameters relating to the metal product 6 may vary from one line to another depending on the type of manufacturing line and also to the metal product 6.

Thus, the computer-implemented monitoring method and the electronic monitoring device 10 according to the present disclosure are more reliable and efficient for monitoring the manufacturing of the metal product 6.

What is claimed is:

1. A method for monitoring a manufacturing of a metal product, the metal product being manufactured according to a manufacturing process, the manufacturing process including a manufacturing route of a manufacturing line for obtaining a final metal product with final characteristics, the manufacturing route comprising one or several intermediate metal products, each one with intermediate characteristics, and the metal product whose manufacturing is monitored being the final metal product, the metal product being chosen from among a group consisting of a slab, a coil, a beam, a bloom, a billet, and a steel product, the monitoring method being implemented by an electronic monitoring device on the manufacturing line that is connected to at least one sensor of the manufacturing line and comprising the following steps:
   acquiring, from the at least one sensor, a measured value of at least one representative parameter, each representative parameter being a parameter relating to the final metal product or a parameter relating to the manufacturing process;
   determining a status of the final metal product among a compliant status and an analysis status, depending on the at least one acquired measured value and on at least one target; and
   when the determined status is the analysis status, computing a corrective action to be applied to the final metal product, among a set of corrective actions and depending on the at least one acquired measured value, the set of corrective actions including a product repair, a product downgrading, a product expertise and a product acceptance.

2. The method according to claim 1, further comprising validating at least one value validated from among the at least one acquired measured value according to a coherence test, the status of the product being then determined on the basis of the at least one value validated from among the at least one acquired measured value.

3. The method according to claim 2, further comprising of modeling at least one characteristic of the metal product from the at least one value which have been validated from among the at least one acquired measured value, the status of the product being determined further on the modeled at least one characteristic.

4. The method according to claim 1, wherein each parameter relating to the metal product is a parameter from among the group consisting of: a parameter relating to mechanical properties of the product, a parameter relating to a roughness of the product, a parameter relating to a chemical composition of the product, a parameter relating to the properties of a coating of the product, a parameter relating to dimensions of the product, a parameter relating to a surface aspect of the product and a parameter relating to defectology of the product.

5. The method according to claim 1, wherein each parameter relating to the manufacturing process is a parameter depending on a type of the manufacturing process.

6. The method according to claim 1, wherein the step of computing the corrective action comprises comparing the at least one acquired measured value with a respective predefined acceptability range of values and identifying an abnormality event for each acquired measured value outside the respective predefined acceptability range of values,
   wherein each abnormality event is associated to an elementary zone of the metal product, the elementary zone having a length along the longitudinal direction, each elementary zone with at least one abnormality event being identified as an abnormality elementary zone, and
   when a cumulated length of all the abnormality elementary zones is greater than a predefined percentage of a length of the metal product, the computed corrective action is a product downgrading,
   otherwise, when the cumulated length of all the abnormality elementary zones is lower than or equal to said predefined percentage of the length of the metal product, the computed corrective action is a product repair.

7. The method according to claim 1, wherein the step of determining the status of the metal product comprises comparing the at least one acquired measured value with a respective predefined compliant range of values, each respective predefined compliant range of values depending on the corresponding at least one target, the determined status being the compliant status if said at least one acquired measured value belong to the respective predefined compliant range of values, the determined status being otherwise the analysis status.

8. The method according to claim 7, wherein the step of computing the corrective action comprises comparing at least one acquired measured value with a respective predefined acceptability range of values, each respective predefined acceptability range of values depending on the corresponding at least one target and including the corresponding predefined compliant range of values, for at least one parameter the predefined acceptability range strictly including the predefined compliant range of values, the computed corrective action being equal to the product expertise if the metal product is tagged as a specific product or the corresponding parameter is tagged as specific and if said at least one acquired measured value belongs to the respective predefined acceptability range of values.

9. The method according to claim 8, wherein the computed corrective action is equal to the product acceptance if the metal product is not tagged as a specific product and the corresponding parameter is not tagged as specific and if said at least one acquired measured value belong to the respective predefined acceptability range of values.

10. The method according to claim 7, wherein the step of computing the corrective action comprises comparing the at least one acquired measured value with a respective predefined acceptability range of values, each respective predefined acceptability range of values depending on the corresponding at least one target and being disjoint from the corresponding predefined compliant range of values, the computed corrective action being equal to the product expertise if the metal product is tagged as a specific product or the corresponding parameter is tagged as specific and if said at least one acquired measured value belongs to the respective predefined acceptability range of values.

11. The method according to claim 10, wherein the computed corrective action is equal to the product acceptance if the metal product is not tagged as a specific product and the corresponding parameter is not tagged as specific and if said at least one acquired measured value belongs to the respective predefined acceptability range of values.

12. The method according to claim 7, wherein the step of computing the corrective action comprises identifying an abnormality event for each acquired measured value outside the respective predefined acceptability range of values, the computed corrective action then depending on at least one worst abnormality event, the at least one worst abnormality event being the one or more with a greatest deviation with respect to the corresponding predefined acceptability range of values.

13. A method of manufacturing a metal product comprising:

performing the monitoring method according to claim 1; and applying the computed corrective action to the final metal product.

14. A non-transitory computer-readable medium comprising a computer program including software instructions which, when executed by a processor, implement the method according to claim 1.

15. An electronic monitoring device for monitoring a manufacturing of a metal product, the metal product being manufactured according to a manufacturing process, the manufacturing process including a manufacturing route of a manufacturing line for obtaining a final metal product with final characteristics, the manufacturing route comprising one or several intermediate metal products, each one with intermediate characteristics, and the metal product whose manufacturing is monitored being the final metal product, the metal product being chosen from among the group consisting of: a slab, a coil, a beam, a bloom, a billet, and a steel product, the electronic monitoring device being on the manufacturing line and being connected to at least one sensor of the manufacturing line, the electronic monitoring device comprising:

an acquisition module configured for acquiring, from the at least one sensor, a measured value of at least one representative parameter, each representative parameter being a parameter relating to the final metal product or a parameter relating to the manufacturing process a determination module configured for determining a status of the final metal product among a compliant status and an analysis status, depending on the at least one acquired measured value and on at least one target; and a computation module configured for, when the determined status is the analysis status, computing a corrective action to be applied to the final metal product, among a set of corrective actions and depending on the at least one acquired measured value, the set of corrective actions including a product repair, a product downgrading, a product expertise and a product acceptance.

16. An installation for delivering a metal product, the installation comprising:

a manufacturing line for manufacturing the metal product according to a manufacturing process; and an electronic monitoring device for monitoring the manufacturing of the metal product, the electronic monitoring device being according to claim 15.

* * * * *